US012625272B2

(12) United States Patent
Michel et al.

(10) Patent No.: US 12,625,272 B2
(45) Date of Patent: May 12, 2026

(54) DETECTION AND TELEMETRY BY ELECTROMAGNETIC RADIATION PULSES

(71) Applicant: OFFICE NATIONAL D'ETUDES ET DE RECHERCHES AÉROSPATIALES, Palaiseau (FR)

(72) Inventors: David Tomline Michel, Orsay (FR); Laurent Mugnier, Meudon (FR); Matthieu Valla, Epinay sur Orge (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 862 days.

(21) Appl. No.: 17/922,929

(22) PCT Filed: Apr. 23, 2021

(86) PCT No.: PCT/FR2021/050711
§ 371 (c)(1),
(2) Date: Nov. 2, 2022

(87) PCT Pub. No.: WO2021/224560
PCT Pub. Date: Nov. 11, 2021

(65) Prior Publication Data
US 2023/0221445 A1 Jul. 13, 2023

(30) Foreign Application Priority Data

May 6, 2020 (FR) ..................................... 20 04482

(51) Int. Cl.
*G01S 17/95* (2006.01)
*G01S 7/4865* (2020.01)
(Continued)

(52) U.S. Cl.
CPC ............ *G01S 17/95* (2013.01); *G01S 7/4865* (2013.01); *G01S 7/4917* (2013.01); *G01S 17/58* (2013.01)

(58) Field of Classification Search
CPC ...... G01S 17/95; G01S 7/4865; G01S 7/4917; G01S 17/58; G01S 17/34; Y02A 90/10
See application file for complete search history.

(56) References Cited

U.S. PATENT DOCUMENTS 5,149,983 A 9/1992 Kaiblinger
10,803,758 B1 * 10/2020 Barr ........................ G01S 7/417
(Continued)

FOREIGN PATENT DOCUMENTS

CN 103593980 A 2/2014
CN 103782198 A 5/2014
(Continued)

OTHER PUBLICATIONS

Office Action issued on Apr. 30, 2025, in corresponding Chinese Application No. 202180033030.0, 10 pages.
(Continued)

*Primary Examiner* — Fernando Alcon
(74) *Attorney, Agent, or Firm* — Maier & Maier, PLLC

(57) ABSTRACT
A process and system for detection and telemetry using electromagnetic radiation pulses allows characterization of a radial velocity distribution as a function of a separation distance within an exploration zone. An impulse response from the system is used for decomposing a measurement signal which is collected for each acquisition sequence performed for a useful measurement. The result of the decomposition includes an estimate of the radial velocity distribution as a function of the separation distance.

18 Claims, 3 Drawing Sheets

(51) Int. Cl.
    *G01S 7/4912*       (2020.01)
    *G01S 17/58*       (2006.01)

(56) References Cited

U.S. PATENT DOCUMENTS

| | | | |
|---|---|---|---|
| 11,181,807 B1 * | 11/2021 | Ray | G01S 7/499 |
| 2007/0171396 A1 | 7/2007 | Harris et al. | |
| 2012/0050750 A1 * | 3/2012 | Hays | G01P 5/26 |
| | | | 356/519 |
| 2012/0206712 A1 * | 8/2012 | Chang | G01S 17/87 |
| | | | 356/28 |
| 2014/0049420 A1 | 2/2014 | Lehning et al. | |
| 2014/0153364 A1 | 6/2014 | Lewis et al. | |
| 2017/0139047 A1 * | 5/2017 | Abari | G01W 1/02 |
| 2022/0179096 A1 * | 6/2022 | Hoehenberger | B60W 10/20 |
| 2022/0350028 A1 * | 11/2022 | Tows | G01S 7/497 |
| 2022/0373690 A1 * | 11/2022 | Samson | G01S 7/4814 |
| 2024/0214539 A1 * | 6/2024 | Valli | H04N 19/597 |
| 2024/0255625 A1 * | 8/2024 | Jiang | G01S 7/4911 |
| 2024/0329249 A1 * | 10/2024 | Lombard | G01S 7/486 |
| 2025/0138194 A1 * | 5/2025 | Hiller | G05D 1/0204 |
| 2025/0203356 A1 * | 6/2025 | Elshafie | H04L 9/3247 |
| 2025/0271559 A1 * | 8/2025 | Jiang | G01S 17/58 |
| 2025/0314749 A1 * | 10/2025 | Hiller | G01S 17/88 |

FOREIGN PATENT DOCUMENTS

| | | | | |
|---|---|---|---|---|
| FR | 2 965 064 | 3/2012 | | |
| FR | 3 022 349 | 12/2015 | | |
| RU | 2326402 C1 | 6/2008 | | |
| WO | WO-2023150884 A1 * | 8/2023 | | G01S 7/4817 |
| ZA | 916803 B | 5/1992 | | |

OTHER PUBLICATIONS

Wang et al., "Target Range and Speed Measurement Method Based on Golomb Series Modulation", Journal of Computer Applications, Mar. 10, 2018, vol. 38, Issue 3, pp. 911-915, with English abstract.
International Search Report and Written Opinion of the ISA for PCT/FR2021/050711 dated Sep. 14, 2021, 10 pages.

* cited by examiner

DETECTION AND TELEMETRY BY ELECTROMAGNETIC RADIATION PULSES

CROSS-REFERENCE TO RELATED APPLICATIONS

This application is the U.S. national phase of International Application No. PCT/FR2021/050711 filed Apr. 23, 2021 which designated the U.S. and claims priority to FR Patent Application No. 20 04482 filed May 6, 2020, the entire contents of each of which are hereby incorporated by reference.

FIELD OF THE INVENTION

The present description relates to a process and a system for detection and telemetry by electromagnetic radiation pulses, in particular for conducting anemometric measurements.

DESCRIPTION OF RELATED ART

Systems for detection and telemetry by using electromagnetic radiation pulses are used for many applications, in particular for characterizing fluid flows. The radiation pulses are emitted towards an exploration zone which could contain one or more targets to be characterized, and a portion of each pulse which is backscattered or retroreflected by each target is detected by the system on return. In the case of a fluid flow to be characterized, the targets are comprised of backscattering particles which are present in suspension in the fluid, and which are driven into movement in accordance with the velocity of the fluid at each location in the exploration zone. For atmospheric flows, the targets are comprised of aerosol droplets, dust, ice grains, etc. which are suspended in the air.

Such systems for detection and telemetry by using electromagnetic radiation pulses can be of LIDAR ("Light Detection and Ranging") type or RADAR type ("Radio Detection and Ranging"). For LIDAR systems, the emitted radiation is of laser type, where the frequency of this radiation is commonly comprised between about 30 THz (terahertz) and 1200 THz, corresponding to wavelengths comprised between about 250 nm (nanometer) and 10 μm (micron). For RADAR systems, the radiowave frequency used is commonly of between 3 MHz (megahertz) and 300 GHz (gigahertz). High-frequency RADAR systems correspond to radiation wavelengths which are of between 1 mm (millimeter) and 7.5 mm, typically.

The use of such systems for characterizing a single target, or few targets, each with a separation distance value and a radial velocity value is well known when the number of targets simultaneously contributing to the measurement signal is small, and/or the respective separation distance and radial velocity values of the targets are well separated from each other. But in the case of characterizing fluid flows, the backscattering targets are continuously distributed in the exploration zone involved with each measurement and have continuously varying radial velocity values. The determination of the radial velocity distribution as a function of the separation distance is then much more difficult.

A known method for determining the radial velocity distribution as a function of the separation distance, by using an electromagnetic radiation pulse detection and telemetry system, consists in calculating the intensity of the detected radiation for each detection instant and for each emitted radiation pulse. To this purpose, the contributions from parts of the content of the exploration zone which correspond to a same value of detection time of the backscattered radiation, after a round trip of the radiation between the system and each part of the content, are added. This calculation method uses a "laminated model," wherein the exploration zone is cut into successive spatial slices depending on the separation distance, and a single radial velocity value is associated with each spatial slice. Backscattered radiation intensities are thus calculated for several possible radial velocity distributions as a function of the separation distance, and then the one of these distributions which best corresponds to the backscattered radiation which was actually detected is accepted as the measurement result. However, such a measurement method has the following disadvantages:

contributions to the backscattered radiation which correspond to a same emitted pulse, but to portions of this pulse which were emitted at different times and backscattered from different separation distances in the exploration zone, are detected at the same time. For this reason, the spatial resolution obtained by such method is of the order of $C \cdot \tau/2$, where C is the propagation speed of the radiation outside of the detection and telemetry system, and $\tau$ is the duration of each pulse. In other words, spatial resolution finer than $C \cdot \tau/2$ is not possible with a laminated model method; and because the radial velocity value of the targets is deduced from the frequency of the backscattered radiation which is detected, it can only be estimated based on an analysis of this backscattered radiation which is limited to within a time window. Since this time window is generally selected in order to have a duration which is equal to that of the emitted laser radiation pulse, it then follows that the spatial resolution is of order $C \cdot \tau$; and in order to get a spatial resolution which is better than $C \cdot \tau$, it is necessary to consider contributions from all the spatial slices for all measurements relating to different detection times, and not the contribution of a single spatial slice onto each measurement.

Technical Problem

From this situation, an object of the present invention is to improve the efficiency of measurements by detection and telemetry using electromagnetic radiation pulses. More specifically, the object of the invention is to improve spatial resolution and accuracy of radial velocity measurement results which are obtained for a continuous medium to be characterized, for example for a fluid flow to be characterized, in particular in a portion of the atmosphere.

Another object of the invention consists in taking into account the operation of the detection and telemetry system using electromagnetic radiation pulses, in order to reduce the quantity of calculations necessary for deducing from a measurement signal which is collected during an acquisition sequence a measurement result which characterizes the targets contained in the exploration zone.

BRIEF SUMMARY OF THE INVENTION

To achieve at least one of these objects or another, a first aspect of the invention proposes a new detection and telemetry process by using electromagnetic radiation pulses, in order to characterize a radial velocity distribution as a function of a separation distance within an exploration zone. This process of the invention comprises the following steps:

1) getting a system for detection and telemetry by using electromagnetic radiation pulses, that is adapted for, during an acquisition sequence, emitting at least one electromagnetic radiation pulse, detecting a portion of the at least one radiation pulse which was backscattered by at least one target present in the exploration zone, and producing a measurement signal which corresponds to this backscattered and detected radiation pulse portion, wherein this measurement signal contains information on the separation distance and radial velocity of each target, the information on the radial velocity of each target corresponding to a frequency shift due to the Doppler effect which occurs when the radiation is backscattered by this target; and 2) performing an acquisition sequence by controlling the system for emitting the at least one pulse into the exploration zone.

The process of the invention further comprises the following additional steps:

3) getting a characterization of an impulse response of the system, in particular by simulation or measurement, where this impulse response corresponds to the measurement signal which is produced by the system during an acquisition sequence and when a single backscattering element is in the exploration zone, this single backscattering element corresponding to a single separation distance value and having a known radial velocity value, possibly zero, relative to the system, and when the exploration zone has no backscattering element other than the so-called single backscattering element; and 4) by treating the measurement signal which was produced in step 2) as a sum of contributions which each correspond to the impulse response applied to a value for the separation distance and to a value for the radial velocity, and multiplied by a backscattering amplitude value, getting by decomposition of the measurement signal into several contributions, a measurement result in the form of pairs which are each comprised of a backscattering amplitude value and a radial velocity value, and which are assigned respectively to several separation distance values within the exploration zone.

Put another way, the result of the process of the invention is comprised of a backscattering amplitude distribution and by a radial velocity distribution, where the two distributions are functions of the separation distance between the system used and the inside of the exploration zone. The backscattering amplitude distribution characterizes the concentration or the type of the targets which are present in variable locations in the exploration zone, and the radial velocity distribution characterizes a displacement of these targets at the same locations, where this displacement can vary between different locations within the exploration zone. When the medium to be characterized is a flowing fluid, the radial velocity distribution constitutes a characterization of the radial velocity field of the flow.

Unlike the method known from the prior art, which proceeds by addition of the contributions to the radiation which is backscattered from spatial slices of the exploration zone and then detected at a determined time, the process of the invention is based on addition of contributions from spatial slices of the exploration zone to the measurement signal which is collected by the system used during an acquisition sequence. In this way, the process of the invention simultaneously takes into account contributions from spatial slices of decomposition of the exploration zone, and the effects of the operation of the system used. In particular, it takes into account the shape of the electromagnetic radiation pulses which are emitted in each acquisition sequence, and also the detection mode and the signal processing which are applied within a detection path of the system. In other words, the features of the emission of radiation by the system used, the propagation effects of the radiation between the system and the exploration zone, and in the exploration zone, for both directions of the round-trip of the radiation, the backscattering power which is locally effective in the exploration zone, and the features of signal detection and processing in the detection path of the system used are all considered simultaneously in the process from the invention. For this reason, the process of the invention is particularly efficient for reducing the quantity of calculations implemented. This efficiency is obtained by the use of the impulse response, which contains the features of the radiation emission which is produced by the system used, and the signal detection and processing features of this system. The measurement signal is then interpreted, according to the invention, as a result of the convolution of this impulse response with a backscattering amplitude distribution that is a function of the separation distance and radial velocity values corresponding to the content of the exploration zone. Step 4) consists of performing an operation by calculation which is the inverse of this convolution, and sometimes called deconvolution.

In various embodiments of the invention, the impulse response may be a function of both the separation distance, or round-trip time of the radiation from an optical outlet of the system, and also of one among:

a spectral component frequency of the radiation pulse portion which was backscattered and then detected by the system;

a frequency shift between a spectral component of the radiation pulse portion which was backscattered and then detected by the system, and the radiation of each pulse as emitted by the system, or a radial velocity value associated with this frequency shift by Doppler effect; and a frequency of a spectrum of the measurement signal which is used in step 3).

Possibly, the characterization of the impulse response may be obtained in step 3) by performing out at least one acquisition sequence with the detection and telemetry system by using electromagnetic radiation pulses, and with a single backscattering element which is positioned at a determined separation distance in the exploration zone. In this case, step 3) constitutes an experimental calibration of the system used. Alternatively, the characterization of the impulse response may be obtained by performing a numerical simulation of an operation of the detection and telemetry system by using electromagnetic radiation pulses when a single backscattering element is present at a determined separation distance in the exploration zone. In both cases, the characterization of the impulse response obtained may be imperfect. In particular, in the first case, where an acquisition sequence is used for calibration of the system, the characterization of the impulse response obtained may be affected by detection noise, by effects of a sampling and digitization of values which may be implemented, etc. In the second case, where the impulse response of the system is characterized by numerical simulation, secondary physical phenomena may not be taken into account.

Generally, the process of the invention is compatible with a monostatic or bistatic type system for detection and telemetry by electromagnetic radiation pulses. In the context of the present invention, monostatic is understood to mean a system for which the output and detection optical ports of this system are coincident, contiguous or close to each other relative to the separation distance which exists between the system and the exploration zone. On the other hand, bistatic is understood to mean a system for which the output and detection optical ports are spatially separated.

Also generally, the detection and telemetry system by using electromagnetic radiation pulses which is used for implementing the invention may be adapted for executing measurements according to any detection mode. In particular, a detection mode may be used where the frequency shift of the backscattered radiation, which is due to the Doppler effect occurring during reflection or backscattering of the emitted pulses on mobile target(s), is measured by having the detected backscattered radiation interfere with itself. Such a detection mode is called "direct detection." However, the system may be adapted preferably for implementing a heterodyne detection mode, where the backscattered radiation which is detected is mixed with a reference wave, and a beat resulting from this mixing is analyzed. In this case, the measurement signal, which is produced at each acquisition sequence and which is used in step 4), is a heterodyne measurement signal.

Again generally, the detection and telemetry system by using electromagnetic radiation pulses which is used for implementing the invention may be of LIDAR type. In this case, the radiation of the pulses which are emitted by this system is a laser radiation, and each radiation pulse may have one or more of the following features:

a radiation wavelength inside the pulse may be comprised between 250 nm and 10 μm;
   a duration of each pulse may be comprised between 50 ns (nanosecond) and 1 μs (microsecond); and
   the pulse may have a frequency width at half-maximum which is less than 1 GHz, preferably less than 20 MHz.

Alternatively, the detection and telemetry system by using electromagnetic radiation pulses which is used for implementing the invention may be of RADAR type. In such another case, the radiation of the pulses which are emitted by this system have a vacuum wavelength comprised between 1 mm and 7.5 mm.

In first preferred implementations of the invention, the measurement result may be deduced from the measurement signal in step 4) by applying a two-dimensional decomposition algorithm which uses a a-posteriori maximum type method, or a maximum likelihood method, which could be regularized, in this case also called penalized, or not, or even a stochastic method such as a Markov chain Monte Carlo method. Possibly, the process may then comprise an additional step which is executed from the measurement result provided by the two-dimensional decomposition algorithm, in order to reduce widths of radial velocity distributions which are separately assigned to several values of the separation distance in the exploration zone.

In second preferred implementations of the invention, step 4) includes assigning a single radio velocity value and a single backscattering amplitude value to each value of the separation distance, for a sampling of values of the separation distance inside the exploration zone. A reconstruction of the measurement signal is then calculated as a sum of contributions each equal to the impulse response applied to a separation distance value and to the radial velocity value which was assigned to this separation distance value, and multiplied by the backscattering amplitude value which was also assigned to the same separation distance value, for all the separation distance values in the sampling. Iterative adjustments of the assigned radial velocity and backscattering amplitude values are then performed, so as to reduce a deviation between the measurement signal which was produced in step 2) and the reconstruction of the measurement signal that results from the values assigned to the radial velocity and to the backscattering amplitude. The measurement result is then formed by the radial velocity and backscattered amplitude values assigned to the separation distance values, which provide the minimum deviation between the measurement signal and the reconstruction of the measurement signal.

Finally, a process conforming to the first aspect of the invention may be advantageously used for at least one of the following applications:

meteorological measurements, for example measurements of atmospheric turbulence;
   measurements of diffusion of atmospheric pollutants;
   measurements of local concentrations of backscattering particles suspended in an environment, or of chemical compounds which absorb and re-emit the radiation from the pulses;
   measurements of shearing of an atmospheric flow, for example at an airport;
   measurements of position and/or lifetime of at least one vortex which is present in a fluid flow;
   anemometric measurements which are performed from an aircraft in flight, in particular from an airship or a drone;
   anemometric measurements which are performed to optimize operation of a wind turbine; and
   anemometrical measurements which are performed for adjusting aircraft flight in formation, or for adjusting a drone flight.

Furthermore, a second aspect of the invention proposes a detection and telemetry system by using electromagnetic radiation pulses, which comprises:

an emission path, suited for emitting at least one electromagnetic radiation pulse into an exploration zone when an acquisition sequence is performed;
   a detection path, suited for detecting, during the acquisition sequence, a portion of at least one emitted radiation pulse after that portion of radiation pulse was backscattered by at least one target present in the exploration zone, where this detection path is further suited for producing a measurement signal which contains information about a separation distance and radial velocity of each target present in the exploration zone, the information about the radial velocity of each target corresponding to a frequency shift due to the Doppler effect which occurs when the radiation is backscattered by this target;
   a controller, which is arranged for activating the emission and detection paths according to the acquisition sequence;
   means for storage of a characterization of an impulse response of the system, where this impulse response corresponds to the measurement signal which is produced by the system during an acquisition sequence and when a single backscattering element is in the exploration zone, this single backscattering element corresponding to a single separation distance value and having a radial velocity value, possibly zero, relative to the system, and when the exploration zone has no backscattering element other than the so-called single backscattering element; and
   calculation means suited for decomposing the measurement signal as a sum of contributions which each correspond to the impulse response applied to a value of the separation distance and to a value of the radial velocity, and multiplied by a backscattering amplitude value, so as to output a measurement result in the form of pairs which are each comprised of a backscattering amplitude value and a radial velocity value, and which are assigned respectively to several separation distance values within the exploration zone.

Such system is in particular suited for implementing a process according to the first aspect of the invention.

BRIEF DESCRIPTION OF THE DRAWINGS

The features and advantages of the present invention will appear more clearly in the following detailed description of non-limiting implementation examples given with reference to the attached drawings in which.

DETAILED DESCRIPTION OF THE INVENTION

For clarity sake of the following description, components which are not directly involved in the invention, or which can be adapted spontaneously by the person skilled in the art for implementing the invention, are not shown or described.

The invention is now described, as an example, for a LIDAR pulse system with heterodyne detection. However, the invention may be easily transposed, based on the following description, to other detection modes than heterodyne detection, and/or to a RADAR system. In general, the invention relates to the conversion of a measurement signal into a measurement result which comprises a radial velocity distribution as a function of a separation distance. Equivalently, each radial velocity value may be replaced in this characterization by a frequency shift value which is produced by Doppler effect, by a target which has the radial velocity value. The formula, known to the person skilled in the art, which expresses this equivalence, is $\Delta f=-2 \cdot v_r/\lambda$, where $\Delta f$ is the frequency shift, $v_r$ is the radial velocity of the target and $\lambda$ is the wavelength of the radiation. Similarly, each separation distance value may be replaced by a duration between the time of emission of the radiation and the subsequent time of detection at which a backscattered portion of this radiation is detected, by means of the formula $d_e=C \cdot (t_d-t_0)/2$, where $t_d$ is the detection time and to is the emission time, $d_e$ is the separation distance. Further, as an example, the LIDAR system which is described below is suited for performing anemometric measurements, by using laser radiation backscattering which is produced by particles present suspended in the air. These backscattering particles, which form targets to be characterized and which may be aerosol droplets, dusts or ice grains, are designated by reference number 100 in FIG. 1.

Figure 1:
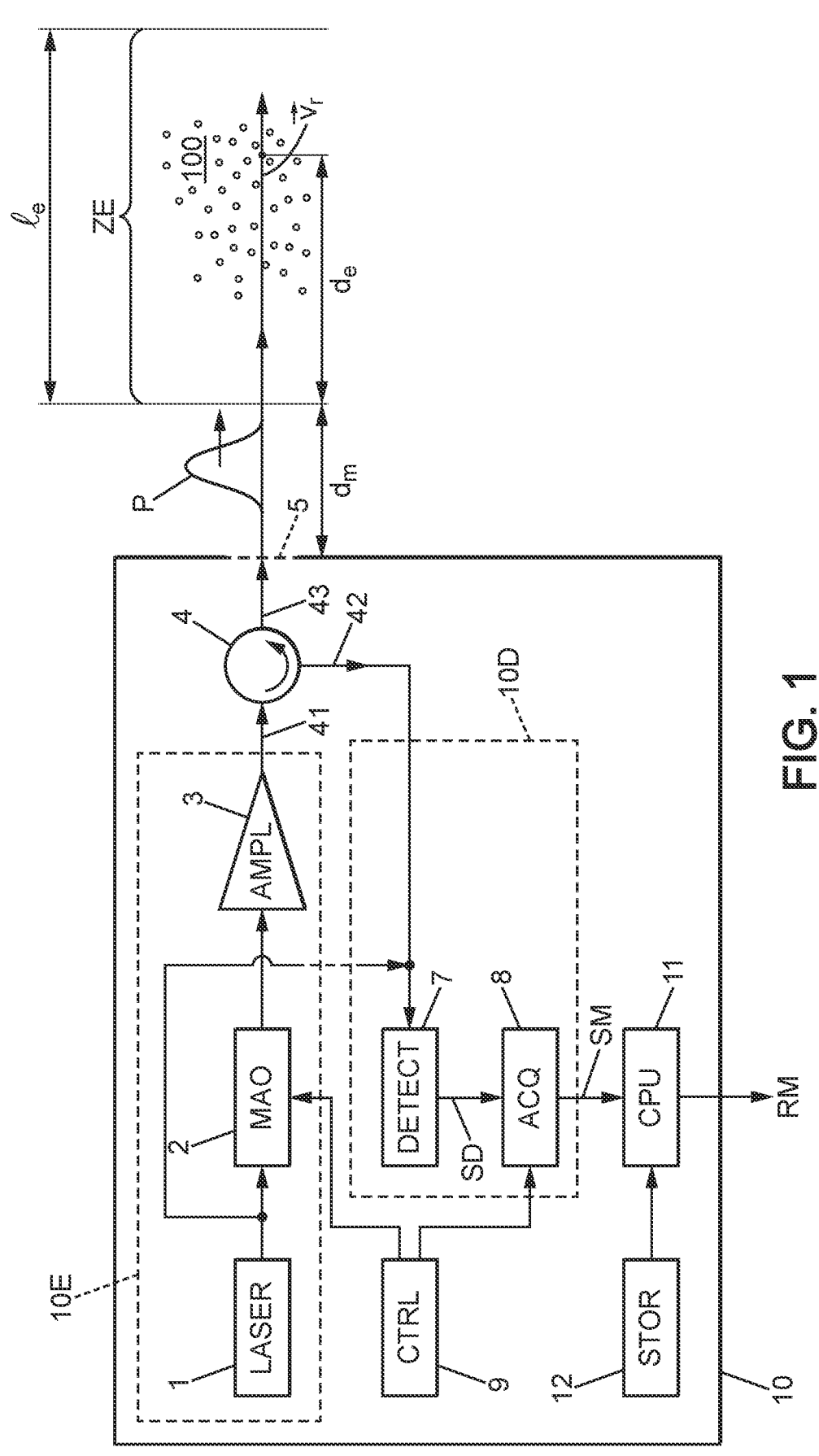
FIG. 1 is a synoptic diagram of a detection and telemetry system by using electromagnetic radiation pulses, to which the invention may be applied.

In accordance with FIG. 1, the LIDAR system 10 comprises an emission path 10E and a detection path 10D. The emission path 10E comprises a laser source 1, that produces a monochromatic radiation which may have a wavelength equal to 1545 nm when this radiation propagates in air, at least one acoustico-optical modulator 2, labeled MAO and controlled in order to form successive pulses from the laser radiation which is produced by the source 1, and an optical amplifier 3, labeled AMPL. The acoustico-optical modulator 2 further produces a frequency shift for the laser radiation emitted by the LIDAR system 10 towards a target relative to the laser radiation as produced by the source 1. In this way, a heterodyne detection signal which is produced in the detection path 10D has a non-zero beat frequency when the radiation is retroreflected by an immobile target. The detection path 10D comprises a detector 7, labeled DETECT, and an acquisition card 8, labeled ACQ. The acquisition card 8 is connected in order to receive an analog, electrical heterodyne detection signal produced by the detector 7 and labeled SD. It is designed for applying processing to this detection signal SD, and outputting a measurement signal which results from this processing and which is labeled SM. In particular, the acquisition card 8 may execute sampling and digitization functions on the detection signal SD, accumulation functions for the digitized signal for several identical radiation pulses which are emitted successively, filtering, etc. Possibly, an electrical signal amplifier, not shown, may be used on the detection signal SD transmission link between the detector 7 and the acquisition card 8. According to the heterodyne detection mode, the detector 7 receives at input a mixture of the portion of each pulse which was received by the detection path 10D and a portion of the emitted laser radiation which is extracted from between the source 1 and the acoustico-optic modulator 2. As is known, the portion of the emitted laser radiation which is transmitted to the detector 7 from the emission path 10E may undergo various intermediate transformations, between extraction thereof from the emission path 10E and the detector 7. The acoustico-optical modulator 2 and the acquisition card 8 are commanded by a controller 9, which is labeled CTRL and provides to the system LIDAR operation thereof at each acquisition sequence.

When the LIDAR system 10 is of monostatic type, the emission path 10E and the detection path 10D may be coupled by an optical circulator 4 to an optical port 5, where this port serves both as optical output port for the emission path 10D and optical receiving port for the detection path 10D. To this end, the emission path 10E is optically coupled to an optical input port 41 of the optical circulator 4, the detection path 10D is optically coupled to an optical output port 42 of the optical circulator 4, and the optical port 5 of the LIDAR system 10 is optically coupled to a mixed input-output optical port 43 of the optical circulator 4.

Such a LIDAR system 10 is known to the person skilled in the art. Using it, the content of an exploration zone ZE which is located on the path of the laser pulses in front of the optical port 5 outside the system 10 can be analyzed. As is known, this exploration zone ZE is an overlap volume between a propagation track of the laser pulses beyond the optical port 5, and a medium to be characterized which is located outside of the system 10. A distance $d_m$ which separates a proximal limit of the exploration zone ZE from the optical port 5 may be defined by a time detection window which is applied by the detection path 10D, in particular by the acquisition card 8. A length $l_e$ of the exploration zone ZE is also determined by the time detection window. Alternatively, the exploration zone ZE may be determined by a convergence which is applied to the laser pulses, for example by using a converging lens to form the optical port 5. Also, each laser pulse has a pulse duration which is denoted $\tau$ in the remainder. Under these conditions, the measurement signal SM contains a characterization of the targets 100 which are contained in the exploration zone ZE, in terms of separation distance of each target relative to the optical port 5, denoted $d_e$, and radial velocity of each target, denoted $v_r$. In the remainder, the separation distance $d_e$ is counted from the proximal limit of the exploration zone ZE. Further, radial velocity of one of the targets 100 is understood to mean the velocity component thereof which is parallel to the direction of propagation of the laser pulses. It is positive for a movement of the target away from the system 10, and negative when the target moves toward the system 10. When the content of the exploration zone ZE is a portion of atmosphere, the targets 100 are comprised of aerosol droplets, dust and/or ice grains which are suspended in the air and which are driven in movement by air currents such as may exist in the exploration zone ZE. The radial velocity distribution $v_r$ of these air currents can be characterized as a function of the separation distance $d_e$ within the exploration zone ZE from a measurement performed using the LIDAR system 10. Such an application of the LIDAR system 10 for anemometric measurements is also known to the person skilled in the art. A radiation pulse, which is designated by the reference P, is shown symbolically in FIG. 1 propagating between the optical port 5 of the system 10 and the exploration zone ZE.

The invention that is the subject of the present description relates to the transformation of the measurement signal SM, which is delivered by the acquisition card 8, into a measurement result RM relating to the radial velocity distribution $v_r$ in the exploration zone ZE. This transformation may be performed by a calculation unit 11, labeled CPU. Generally, the measurement result RM is comprised of a backscattering amplitude distribution, which is a function of both the separation distance $d_e$ and the radial velocity $v_r$, or equivalently a function of the separation distance $d_e$ and the Doppler effect frequency shift $\Delta f$. This backscattering amplitude distribution of the measurement result RM is denoted $S(d_e,v_r)$, or $S(d_e,\Delta f)$. It constitutes an estimate of an actual backscattering amplitude distribution $S_0(d_e,v_r)$, or $S_0(d_e,\Delta f)$, which is produced by the targets 100 in the exploration zone ZE. Reference 12 designates storage means, labeled STOR, which are accessible to the calculation unit 11. The structure of the storage means 12 may be advantageously selected for facilitating convolution calculations which use the values stored in these means 12.

Figure 2:
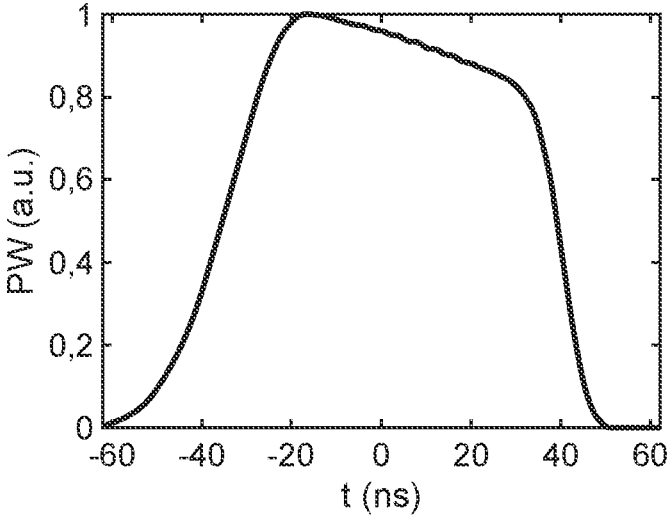
FIG. 2 is a time diagram of a radiation pulse which can be emitted by the system of FIG. 1 for implementing the invention.

FIG. 2 shows an example of a radiation pulse envelope corresponding to the shape of each pulse P such as produced by the emission path 10D of the system 10 and effective downstream from the optical port 5. The abscissa references the time noted t, expressed in nanoseconds (ns), and the ordinate references the instantaneous radiation power, labeled PW and normalized relative to the maximum value thereof. The width at half-height of the pulse shown is about 75 ns, corresponding to a spatial length of about 22 m when the pulse propagates in air outside of the system 10.

Figure 3:
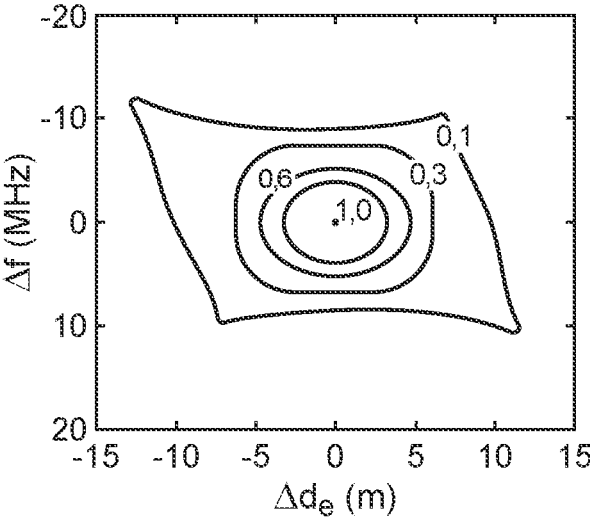
FIG. 3 is a three-dimensional diagram which shows an impulse response from the system according to FIG. 1, for emitted radiation pulses according to FIG. 2.

FIG. 3 shows an example of the impulse response which corresponds to the LIDAR system of FIG. 1 for the pulse shape of FIG. 2. This pulse shape is obtained when a retroreflecting target such as a mirror is arranged in the exploration zone ZE. By definition, the impulse response corresponds to the following conditions:

the retroreflecting target, for example the mirror, is located at a single location in the exploration zone ZE, corresponding to a single value for the separation distance $d_e$;

the retroreflecting target corresponds to a single value for the radial velocity $v_r$ thereof. Preferably, but not indispensably, this radial velocity value of the retroreflecting target may be zero;

this retroreflecting target is the only one inside the exploration zone ZE; and the pulse shape, and preferably also other operating parameters of the system 10, or even all operating parameters thereof, are identical between determination thereof for getting the impulse response and these pulse shape and operating parameters such as used for a useful acquisition sequence, which in the present case is for performing an anemometrical measurement.

The impulse response may be obtained from the measurement signal SM, by restricting this signal within time windows which are progressively offset in time, and by applying an apodization function, for example Gaussian shaped, to each restriction of the measurement signal SM in the corresponding time window. As is known, the goal of an apodization function is to eliminate or attenuate discontinuities which exist in the analyzed signal in order to eliminate or reduce artifacts which could be caused by these discontinuities. In the present case, the ends of the time windows could cause secondary lobes in subsequent Fourier transform results. The apodization function eliminates such lobes. Each portion of the measurement signal SM restricted to a time window, and apodised, is then processed by time-Fourier transform, and then the result of this Fourier transform is squared in order to provide a section of the representation of the impulse response of FIG. 3 at constant separation distance value $d_e$. The origin of the horizontal axis which references the values of the separation distance $d_e$ may be assigned to the one among those values which corresponds to the maximum of the impulse response. In that way, the horizontal axis references offset values $\Delta d_e$, defined relative to this origin for the impulse response. In the following, the sections of the representation of the impulse response which each correspond to a constant value of $\Delta d_e$ are called spectra of the impulse response, and the set of these spectra forms a spectrogram of this impulse response. Each spectrum is therefore a function of the frequency shift $\Delta f$ and is assigned to a value of the separation distance $d_e$ and therefore to a value of the offset $\Delta d_e$, according to the flight time between an emission time of the pulse and the mid-time of the time window which was applied to the measurement signal SM for this spectrum.

The impulse response of the system 10 may be obtained experimentally, for example by actually placing a retroreflecting mirror at an identified location in the exploration zone ZE, and by providing this retroreflecting mirror with a radial velocity of motion which is also identified. Preferably, the retroreflecting mirror may be immobile relative to the system 10 for such an experimental determination of the impulse response. An acquisition sequence is then executed by the system 10, during which the calculation unit 11 applies operations of division and transformation that were just described to the measurement signal SM as outputted by the acquisition card 8.

Alternatively, the impulse response may be obtained by a numerical simulation of the operation of the system 10 during an acquisition sequence, by simulating the effect on the emitted radiation pulses of the retroreflecting mirror which is placed in the exploration zone ZE.

Generally, getting the impulse response constitutes a calibration of the system 10 for subsequently using this system 10 to perform useful measurements. The impulse response which was determined for the system 10 is stored in the storage means 12.

In the diagram of FIG. 3, the horizontal axis may therefore reference the separation distance offset $\Delta d_e$ relative to the position of the retroreflecting target used for calibration. It is expressed in meters. The vertical axis references the frequency shift $\Delta f$, expressed in megahertz, relative to a frequency of the radiation in the emission path 10E. Finally, the third axis of the diagram of FIG. 3 references an amplitude of the impulse response, which may be expressed in arbitrary units (a.u.). It corresponds to the level lines for the indicated values 0.1, 0.3, 0.6 and 1.0. The impulse response shows that the single retroreflecting target, because of the shape of each pulse and the signal processing which is applied in the detection path 10D, appears in the measurement signal SM as a spread out set of retroreflecting targets which are moving according to a radial velocity distribution spread around the actual radial velocity value of the single target. This spreading of the impulse response in terms of the separation distance and radial velocity is due in particular to the finite width of the pulse of FIG. 2, and to the detection time window which is applied by the acquisition card 8. Furthermore, the radial velocity distribution depends on the offset $\Delta d_e$ relative to the actual separation distance of the single target which was used for calibration of the system 10, in such a way that the impulse response is a function of two variables $\Delta d_e$ and $v_r$, or equivalently of $\Delta d_e$ and $\Delta f$. In the following, $h(\Delta d_e, \Delta f)$ designates this impulse response. Furthermore, for the example which is shown in FIG. 3, the oblique stretching which affects the impulse response in the $\Delta d_e$ and $\Delta f$ system of axes reveals a drift of about 3 MHz in the frequency of each emitted pulse, between start and end of this pulse. Such an emission frequency drift will thus automatically be included in the processing for getting the measurement result RM for a useful acquisition sequence so that this drift does not introduce an error into this result.

When an acquisition sequence, said to be useful, is performed with the system 10 on an atmospheric portion containing the exploration zone ZE, the measurement signal SM which is then outputted by the acquisition card 8 is considered as an incoherent sum of laser pulse parts which are backscattered by targets distributed in the exploration zone ZE at various values of the separation distance $d_e$. These targets are associated with backscattering amplitude and radial velocity values for each of the separation distance values, between 0 and $l_e$. The calculation unit 11 then applies to the measurement signal SM as outputted by the acquisition card 8 substantially the same processing as what was described above to get the impulse response experimentally. This processing comprises the following steps:

restricting the measurement signal SM to the time windows which are progressively shifted in time;

applying an apodization function to the portion of the measurement signal SM which is contained in each time window;

applying a time-Fourier transform to the apodised portion of the measurement signal SM which is contained in each time window;

calculating, for each time window and for each frequency value f, the square of the result of the Fourier transform, so as to get a spectrum for this time window.

The set of spectra then forms a useful acquisition sequence spectrogram which characterizes the content of the exploration zone ZE. Within this useful acquisition sequence spectrogram, each spectrum is assigned to the value of the separation distance $d_e$ which corresponds to the flight time between the emission time of the pulse and the mid-time of the time window which was applied to the measurement signal SM for this spectrum. The spectrogram is written $Sp(d_e, \Delta f)$ by taking a reference frequency in order to define the frequency shift $\Delta f$ between each spectral component and this reference frequency. In the case of heterodyne detection, this reference frequency is the frequency of the monochromatic radiation produced by the laser source 1. Then, without considering possible measurement noise, the spectrogram $Sp(d_e, \Delta f)$ may be modeled by $[S_0 {}^* h](d_e, \Delta f)$ where $S_0(d_e, \Delta f)$ is again the amplitude distribution of backscattering of the content of the exploration zone ZE during the useful acquisition sequence, and $*$ designates the two-dimensional convolution operation.

The calculation unit 11 then determines an estimate of the backscattering amplitude distribution $S_0(d_e, \Delta f)$ from the spectrogram $Sp(d_e, \Delta f)$. This estimate of the backscattering amplitude distribution $S_0(d_e, \Delta f)$ may constitute the measurement result RM and is denoted $S(d_e, \Delta f)$. To do that, several algorithms may be used alternatively, including the two following ones which are given as non-limiting examples.

A two-dimensional decomposition algorithm. Such algorithm is applied to the spectrogram $Sp(d_e, \Delta f)$ by using the impulse response $h(\Delta d_e, \Delta f)$. It is commonly called two-dimensional decomposition algorithm and may use a maximum likelihood method, which consists in minimizing a data attachment criterion, also called cost function, such as for example a least-squares criterion which measures the deviation between the spectrogram $Sp(d_e, \Delta f)$ and the modeling of this spectrogram in the form $[S {}^* h](d_e, \Delta f)$. A second possible method, called a-posteriori maximum method, consists in adding to the data attachment criterion, a regularizing criterion, also called penalization criterion, which contains information from prior knowledge of certain features of the content of the exploration zone ZE. Such information may for example be that each spectrum has a very small spectral width. An example of a reference work on such a a-posteriori maximum method is "Bayesian Approach to Inverse Problems," edited by J. Idier, ISTE/John Wiley, London, 2008, pp. 243-283. A third method, that is also possible, may be a stochastic method, also called Monte Carlo method, where the solution is sought by exploration of a set of states which are possible for the content of the exploration zone ZE, as a function of at least one random characteristic. Such a Monte Carlo method is further called with Markov chains when each new draw of the random characteristic depends only on the results of the current draw, without depending on results of earlier draws. An example of a reference work on these stochastic methods is "Monte Carlo Statistical Methods," by Christian Robert and George Casella, Springer-Verlag, Springer Texts in Statistics series, 2010. Generally, the two-dimensional decomposition methods are sufficiently known to the person skilled in the art so that it is not necessary to describe them further here. The result of a two-dimensional decomposition is the estimate $S(d_e, \Delta f)$ of the backscattering amplitude distribution, which depends on both parameters of separation distance and frequency shift. This estimate $S(d_e, \Delta f)$, such as resulting from the application of the two-dimensional decomposition algorithm, may be improved by an additional step which consists for each value of the separation distance $d_e$, in reducing the width of the radial velocity distribution $v_r$, or of the associated Doppler frequency shift $\Delta f$. A maximum reduction may in particular be obtained by keeping, for each value of the separation distance $d_e$, only the value of the frequency shift $\Delta f$—or else the value of the radial velocity $v_r$—corresponding to the maximum of the estimation distribution $S(d_e, \Delta f)$ such as resulting from the two-dimensional decomposition algorithm. Another maximum reduction method that is also possible consists for each separation distance value $d_e$, in only keeping the frequency shift $\Delta f$ corresponding to the center of the peak of the estimation distribution $S(d_e, \Delta f)$, as a function of the frequency shift $\Delta f$ and separately for each value with the separation distance $d_e$. The center of the peak may be determined for example from a section at half-maximum of the peak or by fitting the peak with a model thereof.

Figure 4A:
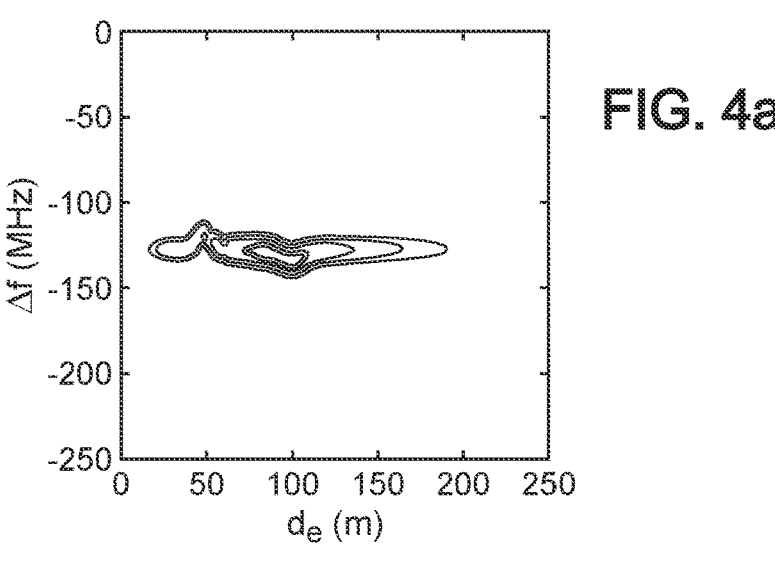
FIG. 4a to FIG. 4c are three three-dimensional diagrams which illustrate an application of the invention to the characterization of a Von Karman type turbulent flow.

FIG. 4a is a first three-dimensional diagram which represents the variations of the spectrogram $Sp(d_e, \Delta f)$ as calculated from the measurement signal SM outputted by the acquisition card 8, for a useful acquisition sequence performed with an airflow in the exploration zone ZE. The horizontal axis of the diagram references the separation distance $d_e$, between 0 and 250 m. The vertical axis of the diagram references the frequency shift $\Delta f$ between −250 MHz and 0, and the third axis of the diagram, which is associated with the indicated level lines, references the spectral amplitude values. This spectrogram has a significant width parallel to the frequency shift axis $\Delta f$, for each value of the separation distance $d_e$.

Figure 4B:
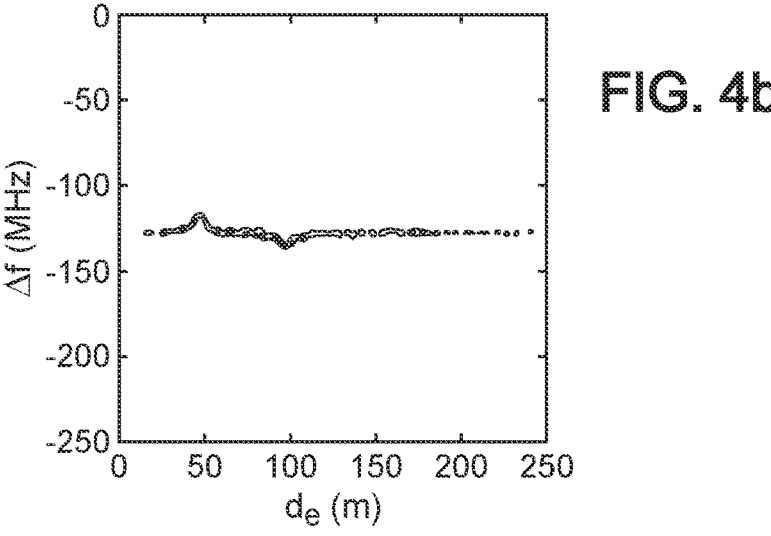
Figure 4C:
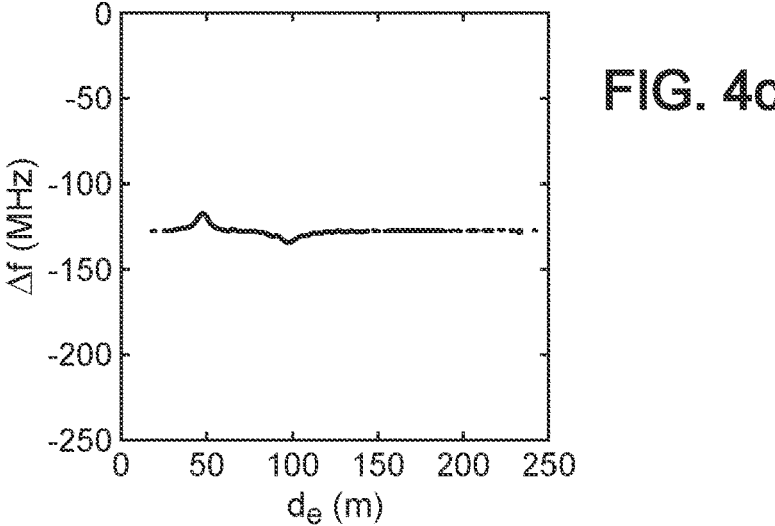

The horizontal and vertical axes of the diagrams of FIG. 4b and FIG. 4c are the same as those from FIG. 4a.

FIG. 4b is a second three-dimensional diagram which shows variations of the estimation distribution $S(d_e, \Delta f)$ as resulting from the two-dimensional decomposition algorithm applied to the spectrum of FIG. 1a. The values of $S(d_e, \Delta f)$ are therefore referenced by the third axis of the diagram, perpendicular to the axes for the separation distance $d_e$ and frequency shift $\Delta f$. For each value of the separation distance $d_e$, the width in frequency shift $\Delta f$ is sharply reduced.

FIG. 4c is a third three-dimensional diagram which shows the variations of the estimation distribution $S(d_e, \Delta f)$ after this distribution has been limited to the maximum value thereof parallel to the axis of frequency shift $\Delta f$ for each value of the separation distance $d_e$. This measurement result RM shows that the air is moving by getting closer to the system 10, locally in a first region corresponding to $d_e$ of about 45 m, and simultaneously moving in a second zone corresponding to $d_e$ of about 100 m but now by moving away from the system 10. These two regions of air movement correspond to two nearly-synchronous vortices of a low-flow regime von Karman turbulent structure, for which the vortex axes are perpendicular to the direction of emission of the laser pulses by the system 10, and through which the laser pulses propagate at a distance from the vortex axes. The general frequency shift of −120 MHz which appears in the three diagrams of FIG. 4a-FIG. 4c is the frequency shift which is added by the acoustico-optical modulator 2, so that the positive and negative radial velocity values can be distinguished based on the measurement signal SM.

An algorithm for decomposition by sparse adjustments. Such an algorithm consists of directly searching for the estimate of the backscattering amplitude distribution $S_0(d_e, \Delta f)$ in the form of a single frequency shift value—or else a single radial velocity value $v_r$—for each value of the separation distance in the exploration zone ZE. It then proceeds with iterative adjustments of these values $\Delta f(d_e)$, and of the backscattering amplitude values which are also assigned one-to-one to the separation distance values $d_e$. At each iteration, a result of the convolution product of the estimation distribution $S(d_e, \Delta f)$ which is thus built, with the impulse response $h(\Delta d_e, \Delta f)$, is compared to the spectrogram $Sp(d_e, \Delta f)$ of the measurement signal SM. Then the adjustment is applied to the frequency shift and backscattering amplitude values which are assigned to at least one of the separation distance values in a direction which reduces the deviation between $[S*h](d_e, \Delta f)$ and $Sp(d_e, \Delta f)$. Such iterations are repeated until a convergence criterion is satisfied. As is known, a threshold criterion may be applied to the deviation between $[S*h](d_e, \Delta f)$ and $Sp(d_e, \Delta f)$. Alternatively, another possible criterion relates to a progression between successive iterations in the reduction of the deviation between $[S*h](d_e, \Delta f)$ and $Sp(d_e, \Delta f)$. The use of such decomposition algorithm for sparse adjustments allows the measurement result RM to better address variations of the radial velocity as a function of the separation distance which correspond to high spatial frequencies.

In order to provide a more complete characterization of a three-dimensional atmospheric portion, the system 10 may be mobile, for example with a variable orientation of the laser pulse emission direction, in order to execute a scan in the atmospheric portion. Then acquisition sequences are repeated by adopting a new orientation of the system 10 each time.

It is understood that the invention may be reproduced by modifying secondary aspects of the embodiments which were described in detail above, while retaining at least some of the advantages indicated above. In particular, all numerical values which were given were only provided for illustration and may be changed according to the application considered. Although the application to a fluid flow characterization was taken as an example, the invention may be used for other applications. Furthermore, the invention may be applied to a pulse radar which operates in the radiofrequency domain, for example with a wavelength which is comprised between 1 mm and 7.5 mm for the radiation of each pulse.

The invention claimed is:

1. A detection and telemetry process using electromagnetic radiation pulses, in order to characterize a radial velocity distribution as a function of a separation distance within an exploration zone, comprising the following steps:

1) getting a system for detection and telemetry by using electromagnetic radiation pulses, that is adapted for, during an acquisition sequence, emitting at least one electromagnetic radiation pulse, detecting a portion of said at least one radiation pulse which was backscattered by at least one target present in the exploration zone, and producing a measurement signal which corresponds to the backscattered and detected radiation pulse portion, where said measurement signal contains information on a separation distance and a radial velocity of each target, the information on the radial velocity of each target corresponds to a frequency shift due to a Doppler effect which occurs when the radiation is backscattered by this target; and 2) performing an acquisition sequence by controlling the system for emitting the at least one pulse into the exploration, wherein the process further comprises the following additional steps:

3) getting a characterization of an impulse response of the system, where the impulse response corresponds to the measurement signal which is produced by said system during an acquisition sequence and when a single backscattering element is in the exploration zone, said single backscattering element corresponding to a single separation distance value and having a known radial velocity value relative to the system, and when the exploration zone has no backscattering element other than the so-called single backscattering element; and 4) by treating the measurement signal which was produced in step 2) as a sum of contributions which each correspond to the impulse response applied to a value for the separation distance and to a value for the radial velocity, and multiplied by a backscattering amplitude value, getting by decomposition of the measurement signal into several contributions, a measurement result in a form of pairs which are each comprised of a backscattering amplitude value and a radial velocity value, and which are assigned respectively to several separation distance values within the exploration zone.

2. The process according to claim 1, wherein the impulse response is a function of both the separation distance, or round-trip time of the radiation from an optical outlet of the system, and also of one among:

a spectral component frequency of the radiation pulse portion which was backscattered and then detected by the system;

a frequency shift between a spectral component of the radiation pulse portion which was backscattered and then detected by the system, and the radiation of each pulse as emitted by said system, or a radial velocity value associated with said frequency shift by the Doppler effect; and a frequency of a spectrum of the measurement signal which is used in step 3).

3. The process according to claim 1, wherein the characterization of the impulse response is obtained in step 3) by performing at least one acquisition sequence with the detection and telemetry system by using electromagnetic radiation pulses, and with a single backscattering element which is positioned at a determined separation distance in the exploration zone, or by performing a numerical simulation of operation of the system when a single backscattering element is present at a determined separation distance in the exploration zone.

4. The process according to claim 1, wherein the detection and telemetry system by using electromagnetic radiation pulses is adapted for implementing a heterodyne detection mode, and the measurement signal which is produced at each acquisition sequence and which is used in step 4), is a heterodyne measurement signal.

5. The process according to claim 1, wherein the detection and telemetry system by using electromagnetic radiation pulses is of LIDAR type and the radiation of each pulse emitted by said system is a laser radiation, or the detection and telemetry system by using electromagnetic radiation pulses is of RADAR type and the radiation of each pulse emitted by said system has a vacuum wavelength comprised between 1 mm and 7.5 mm.

6. The process according to claim 5, wherein the detection and telemetry system by using electromagnetic radiation pulses is of LIDAR type, and wherein each radiation pulse has at least one of the following features:

a radiation wavelength inside the pulse is comprised between 250 nm and 10 μm;

a duration of the pulse is comprised between 50 ns and 1 μs; and the pulse has a frequency width at half-maximum which is less than 1 GHz.

7. The process according to claim 1, wherein the measurement result is deduced from the measurement signal in step 4) by applying a two-dimensional decomposition algorithm which uses a method selected in the list comprising a a-posteriori maximum method, a maximum likelihood method, and a stochastic method.

8. The process according to claim 7, further comprising an additional step which is executed from the measurement result provided by the two-dimensional decomposition algorithm, in order to reduce widths of radial velocity distributions which are separately assigned to several values of the separation distance in the exploration zone.

9. The process according to claim 1, wherein step 4) includes assigning a single radial velocity value and a single backscattered amplitude value to each value of the separation distance, for a sampling of values of the separation distance inside the exploration zone, and then calculating a reconstruction of the measurement signal as a sum of contributions each equal to the impulse response applied to a separation distance value and to the radial velocity value which was assigned to said separation distance value, and multiplied by the backscattered amplitude value which was also assigned to the same separation distance value, for all the separation distance values in the sampling, and then performing a series of iterative adjustments of the assigned radial velocity and backscattered amplitude values, so as to reduce a deviation between the measurement signal which was produced in step 2) and the reconstruction of the measurement signal resulting from the values assigned to the radial velocity and backscattered amplitude, wherein the measurement result is then formed by the radial velocity and backscattered amplitude values assigned to the separation distance values, which provide a minimum deviation between the measurement signal and the reconstruction of the measurement signal.

10. The process according to claim 1, used for at least one of the following applications:

meteorological measurements;

measurements of diffusion of atmospheric pollutants;

measurements of local concentration of backscattering particles suspended in an environment, or of chemical compounds which absorb and re-emit the radiation of the pulses;

measurements of shearing of an atmospheric flow;

measurements of position and/or lifetime of at least one vortex which is present in a fluid flow;

anemometric measurements which are performed from an aircraft in flight;

anemometric measurements which are performed to optimize operation of a wind turbine; and anemometrical measurements which are performed for adjusting aircraft flight in formation, or for adjusting a drone flight.

11. The process according to claim 2, wherein the characterization of the impulse response is obtained in step 3) by performing at least one acquisition sequence with the detection and telemetry system by using electromagnetic radiation pulses, and with a single backscattering element which is positioned at a determined separation distance in the exploration zone, or by performing a numerical simulation of operation of the system when a single backscattering element is present at a determined separation distance in the exploration zone.

12. The process according to claim 2, wherein the detection and telemetry system by using electromagnetic radiation pulses is adapted for implementing a heterodyne detection mode, and the measurement signal which is produced at each acquisition sequence and which is used in step 4), is a heterodyne measurement signal.

13. The process according to claim 3, wherein the detection and telemetry system by using electromagnetic radiation pulses is adapted for implementing a heterodyne detection mode, and the measurement signal which is produced at each acquisition sequence and which is used in step 4), is a heterodyne measurement signal.

14. The process according to claim 2, wherein the detection and telemetry system by using electromagnetic radiation pulses is of LID AR type and the radiation of each pulse emitted by said system is a laser radiation, or the detection and telemetry system by using electromagnetic radiation pulses is of RADAR type and the radiation of each pulse emitted by said system has a vacuum wavelength comprised between 1 mm and 7.5 mm.

15. The process according to claim 3, wherein the detection and telemetry system by using electromagnetic radiation pulses is of LID AR type and the radiation of each pulse emitted by said system is a laser radiation, or the detection and telemetry system by using electromagnetic radiation pulses is of RADAR type and the radiation of each pulse emitted by said system has a vacuum wavelength comprised between 1 mm and 7.5 mm.

16. The process according to claim 4, wherein the detection and telemetry system by using electromagnetic radiation pulses is of LID AR type and the radiation of each pulse emitted by said system is a laser radiation, or the detection and telemetry system by using electromagnetic radiation pulses is of RADAR type and the radiation of each pulse emitted by said system has a vacuum wavelength comprised between 1 mm and 7.5 mm.

17. The process according to claim 2, wherein the measurement result is deduced from the measurement signal in step 4) by applying a two-dimensional decomposition algorithm which uses a method selected in the list comprising a a-posteriori maximum method, a maximum likelihood method, and a stochastic method.

18. The process according to claim 3, wherein the measurement result is deduced from the measurement signal in step 4) by applying a two-dimensional decomposition algorithm which uses a method selected in the list comprising a a-posteriori maximum method, a maximum likelihood method, and a stochastic method.

* * * * *